3,464,973
Patented Sept. 2, 1969

3,464,973
PROCESS FOR SELECTIVE PHOSPHORYLATION OF NUCLEOSIDE

Shunji Ouchi, Tuneo Sowa, Kozo Tunoda, and Saburo Senoo, Nobeoka, Miyazaki, Japan, assignors to Asahi Kasei Kabushiki, Kaisha, Osaka, Japan
No Drawing. Filed July 6, 1967, Ser. No. 651,383
Claims priority, application Japan, July 14, 1966, 41/45,613
Int. Cl. C07d *51/50*
U.S. Cl. 260—211.5           10 Claims

ABSTRACT OF THE DISCLOSURE

Process for preparing nucleotide which comprises reacting nucleoside with a mixture of phosphorus oxyhalogenide, carboxylic acid or an aqueous carboxylic acid, and organic base in a polar organic solvent, and mixing the resultant reaction mixture with water thereby adding phosphate group to primary alcohol on nucleoside.

BACKGROUND OF THE INVENTION

Field of the invention

This invention relates to a process for phosphorylating primary hydroxyl group of nucleoside preferentially and selectively.

An object of this invention is to provide a process for producing nucleotide which is useful as a chemical condiment and reagent, commercially and economically.

Description of the prior art

Heretofore, in the phosphorylation of primary alcohol on nucleoside, the secondary alcohol thereon has been protected with a suitable protecting group.

For example, in the production of ribonucleoside 5'-phosphate from ribonucleoside, there have been required at least the following three steps:

(1) Preparation of 2',3'-O-protected ribonucleoside
(2) Preparation of 2',3'-O-protected ribonucleoside 5'-phosphate
(3) Hydrolysis of 2',3'-O-protecting group Also, there have been made some attempts in the phosphorylation of unprotected nucleoside, for example, as described in J. Chem. Soc., 1940, 746 by Gulland and Hobday; J. Chem. Soc., 1959, 3798, by Baker and Foll; and J. Chem. Soc., 83, 159 (1961) by Tenner. However, in any of the processes proposed therein, the conversion and the selectivity of the reaction are so unsatisfactorily low that they are compeltely impracticable.

On the other hand, there are some studies devoted for the improved process in which both the protecting group addition reaction and the phosphorylation reaction are conducted in one step as described in J. Am. Chem. Soc., 83, 3640 (1961) by Hampton or other similar processes. However, the essence of the reaction is still the same as those of the prior process in which the three steps mentioned above are required.

Summary of the invention

This invention relates to a novel process for introducing phosphate group directly and selectively to primary hydroxyl group of unprotected nucleoside without requiring addition and hydrolysis of protecting group, which is advantageous both from economical and operational points of view over the prior art process.

The process of this invention comprises reacting unprotected nucleoside with a complex formed by an interreaction of phosphorus oxytrihalogenide, carboxylic acid or an aqueous carboxylic acid and organic base in a polar organic solvent, mixing the resulting reaction mixture with water and subjecting the resulting aqueous solution to the conventional treatments such as by active carbon or ion exchange resin, thereby obtaining nucleotide in which phosphoric acid is added to primary hydroxyl group on nucleoside.

Since the complex of phosphorus oxytrihalogenide, carboxylic acid or an aqueous carboxylic acid and organic base is a solid matter at room temperature, it may be dissolved in an organic solvent upon use. However, in actual operation, it is convenient to charge these three components into an organic solvent.

The mixing proportion of these three components is most important in the process of this invention, and phosphorus oxytrihalogenide, carboxylic acid and oragnic base are mixed in the proportion of 2–8:1–4:2–8, and most preferably 2:1:2 in a molar ratio. Departure of the mixing proportion of these components from the range specified above only leads to an unsatisfactory result.

That is, only a complex obtained from a certain specific proportion of phosphorus oxytrihalogenide, carboxylic acid or an aqueous carboxylic acid and organic base may selectively phosphorylate a primary hydroxyl group on nucleoside, and the deviation in the mixing proportion of these components adversely affects the selectivity of the reaction.

Phosphorus oxytrihalogenide suitable for practical use in the process of this invention includes phosphorus oxytrichloride and phosphorus oxytribromide, and the latter which is in the form of a solid may be conveniently used by dissolving the same into an organic solvent explained in detail hereinafter.

Among carboxylic acids which may be used in the process of this invention, formic acid affords the most satisfactory result. However, others such as acetic, propionic, oxalic, butyric, benzoic, phenylacetic, and acrylic acids give a fair result, though they tend to cause side reactions, particularly the formation of acyl derivatives thus they are less favorable than formic acid.

These carboxylic acids may be in the hydrous form and in some case a good result may be obtained. However, in such instance, the molar amount of water contained in carboxylic acid must be taken into account in calculating a molar amount of aqueous carboxylic acid, since water contained therein serves the same function as carboxylic acid in the formation of the complex.

We have invented by this time a process for a selective phosphorylation of nucleoside using a complex obtained from phosphorus oxychloride, water and organic base. The difference of this invention from the previous invention resides in the use of carboxylic acid or an aqueous carboxylic acid in place of the water in the previous invention.

The difference in effect between these two processes is that with the use of combination of water and carboxylic acid, the reaction rate is remarkably accelerated and the selectivity of the reaction is greatly enhanced as compared with the use of water alone as in the previous process.

As is known well, nucleoside is difficultly soluble in any solvent. Thus, the reaction rate of phosphorylation greatly depends upon the dissolution of nucleoside.

Since the rate of dissolution of nucleoside is greatly increased by using carboxylic acid and, as a result, the reaction rate of phosphorylation is accelerated accordingly. Consequently, undesirable side reactions are suppressed and a satisfactory result is obtained.

The use of a mixture of carboxylic acid and water gives many advantages over the independent use of these two components. For example, when carboxylic acids other than formic acid are used, the acylation of nucleoside takes place as described above, but, this undesirable side reaction may be brought under control by the use of water. Also, the reaction rate and the reaction temperature may be adjusted at any desired values by changing the mixing ratio of carboxylic acid to water.

The organic base which is used in the process of this invention greatly affects the result depending upon the type thereof, like carboxylic acid.

Among the organic bases, tertiary amines are most effective, and most of primary and secondary amines and other organic bases are impractical. Of tertiary amines, cyclic tertiary amines such as pyridine and picoline are more preferable than trialkyl amine and triaralkyl amine.

As described above, the complex obtained from phosphorus oxytrihalogenide, carboxylic acid or an aqueous carboxylic acid and organic base is a solid matter at room temperature or its vicinity, it can not be reacted with nucleoside as it is thus, the use of a suitable solvent becomes necessary.

In the process of this invention, the selection of the solvent is another important factor. Although, in general, organic solvent having a greater polarity is more preferable, the use of carboxylic acids and organic bases which may not be used in the process of this invention should be avoided. Also, the use of alcohols, ketones and aldehydes which may react with nucleoside or phosphorylating agent thereby giving rise to side reactions other than contemplated in the process of this invention should, of course, be avoided.

Among polar organic solvents which may be used in the process of this invention, nitriles such as acetonitrile and nitro-compounds such as nitromethane, are particularly preferable. Although cyclic esters such as tetrahydrofuran and dioxane, and halogenated hydrocarbons such as dichloromethane are fairly useful, most of solvents such as alkylethers, esters, hydrocarbons, etc. are hardly usable.

Although no particular restriction is imposed on the amount of organic solvent to be used, the use of excessive amount is not only useless and wasteful but also leads to a decrease in the conversion. Adversely, the use of shortened amount increases the viscosity of the reaction mixture and causes inconvenience in stirring.

In charging and mixing phosphorus oxytrihalogenide, carboxylic acid or an aqueous carboxylic acid and organic base to and with the solvent, it is necessary to take a precaution to mix them slowly with stirring under cooling, as a great amount of heat is generated in the meantime.

In carrying out the phosphorylation reaction, unprotected nucleoside is charged to the mixed solution which is maintained at a temperature of from −30° to 30° C., and most preferably from −10° to 20° C., with stirring.

The reaction mixture which is in the form of a suspension at the initial stage of the reaction turns to practically transparent after a lapse of from 5 minutes to 10 hours. Thereafter, the reaction mixture is mixed with water and allowed to stand for 1 to 5 hours at room temperature or under cooling.

The resulting aqueous solution contains nucleotide in which phosphoric acid is added to primary alcohol. For instance, if ribonucleoside is used as a starting material, it contains ribonucleoside 5'-monophosphate. Though the yield of nucleotide is dependent upon the type of ribonucleoside used, in general, it is within a range of 85–100%.

Description of the preferred embodiments

This invention may be explained more fully and practically in the following examples. However, it should not be construed that these examples restrict this invention as they are given merely by way of illustration:

EXAMPLE 1

There were mixed 40 ml. of acetonitrile, 20 ml. of phosphorus oxychloride, 5.3 ml. of formic acid and 19.6 ml. of pyridine together and to the resulting mixture which was maintained at 0°–20° C. was added 10.7 g. of inosine with stirring.

After stirred for about 30 minutes, the reaction mixture was poured into 400 ml. of cold water and further stirred for 2 hours at 0°–5° C.

To the resulting aqueous solution was added an amount of sodium hydroxide and the pH of the resulting mixture, which contained 99% of phosphate compounds and 98% of inosine 5'-monophosphate, was adjusted at about 1.

Then, the mixture was passed through a column filled with 130 g. of active carbon to adsorb inosinic acid. After the column was washed with 0.1 N aqueous hydrogen chloride and a small amount of water, inosinic acid adsorbed was eluted with a mixture solution of 3% ammonia-10% methanol-water and the resulting eluent was dried up under a reduced pressure to give a residue.

The resulting residue was dissolved in a small amount of water and the solution was passed through a solumn filled with about 40 ml. of Amberlite 200 (H-form), trade name, which was washed with water thereafter.

The effluent and washings were combined together and there was added an aqueous solution of sodium hydroxide to adjust the pH at 7.7—8.0 and concentrated under a reduced pressure until it turned to a syrup. To a part by weight of the resulting concentrate was added about 2 parts by weight of methanol and the mixture was allowed to stand overnight in a refrigerator. The crystals precipitated was filtered off and dried at 110° C. under a reduced pressure to give 14.3 g. of disodium 5'-inosinate having a purity of 98%. Further, the filtrate was concentrated, then, to the concentrate was added an amount of ethanol to afford a small amount of disodium 5'-inosinate.

EXAMPLE 2

40 ml. of acetonitrile, 20 ml. of phosphorus oxychloride, 5.3 ml. of formic acid and 19.5 ml. of pyridine were mixed slowly and successively in order while cooling. To the resulting mixture which was maintained at 0°–20° C. was added 11.3 g. of guanosine with stirring.

After stirred for about an hour, the reaction mixture was mixed with about 500 ml. of cold water and further stirred for about 2 hours at 0°–5° C. To the resulting aqueous solution was added an aqueous solution of sodium hydroxide to adjust the pH at about 1. The solution of which pH was thus adjusted was passed through a column filled with 120 g. of active carbon to adsorb 5'-guanylic acid. After the column was sufficiently washed with water 5'-guanylic acid absorbed was eluted with warm 0.1 N aqueous solution of sodium hydroxide until an ultraviolet absorption was hardly observed.

The effluent was passed through a column filled with anion exchange resin (Amberlite IRA—900, Cl—form, trade name) to adsorb 5'-guanylic acid on said resin, and 5'-guanylic acid thus adsorbed was eluted with 0.02 N aqueous solution of hydrogen chloride until an ultroviolet absorption was nearly disappeared.

After pH of the effluent was adjusted at 7.6–8.0, the same was concentrated under a reduced pressure, then to the concentrate was added methanol very slowly with stirring and colorless needle-like crystals were precipitated After it was allowed to stand overnight, the crystals were filtered off and dried to afford 14 g. of pure disodium 5'-guanylate.

EXAMPLE 3

Example 2 was repeated according to the same precedures as described therein as far as the treatments with active carbon and anion exchange resin except that 10.7 g. of adenosine was used in place of guanosine. The effluent thus obtained was, without adjusting the pH, concentrated under cooling at a low temperature to give beautiful needle-like crystals which were filtered off and dried to give 12.6 g. of 5'-adenylic acid.

EXAMPLE 4

Example 1 was repeated according to the same procedures as described therein except that 9.4 g. of cytidine was substituted for inosine. As a result, 13.9 g. of pure disodium 5'-cytidilate was obtained.

EXAMPLE 5

35 ml. of nitromethane, 16 ml. of phosphorous oxychloride, 4.2 ml. of formic acid and 15.5 ml. of pyridine were mixed slowly together successively in order. To the resulting mixture which was maintained at 0°–5° C., was added 9.8 g. of uridine with stirring.

After stirred for about 30 minutes, the reaction mixture was poured into 300 ml. of cold water and further maintained at 0°–5° C. for 2 hours. After removing separated nitromethane, the resulting aqueous solution was treated according to the same procedures as described in Example 1. As a result, 12.8 g. of disodium 5'-uridinate was obtained.

EXAMPLE 6

Example 1 was repeated according to the same procedures as described therein except except that dichloromethane was used in place of acetonitrile. As a result, 12.5 g. of disodium 5'-inosinate was obtained.

EXAMPLE 7

Example 1 was repeated according to the same procedures as described therein except that 50% aqueous solution of formic acid was used in place of formic acid and the reaction time was 1.5 hours. As a result, 14 g. of disodium 5'-inosinate was obtained.

EXAMPLE 8

Example 1 was repeated according to the same procedures as described therein except that 19 ml. of γ-picoline was used in place of pyridine. As a result, 14.4 g. of disodium 5'-inosinate was obtained.

EXAMPLE 9

Example 1 was repeated according to the same procedures as rescribed therein except that 5.4 ml. of acetic acid was used in place of formic acid and the reaction time was one hour. As a result, 13 g. of disodium 5'-inosinate containing 10% of acetyl derivatives was obtained.

EXAMPLE 10

Example 1 was repeated according to the same procedures as described therein except that 30% aqueous solution of acetic acid was used in place of formic acid and the reaction time was 2 hours. As a result, 13.2 g. of disodium 5'-inosinate was obtained.

EXAMPLE 11

Example 2 was repeated according to the same procedures as described therein except that 1.0 g. of 1-α-D-arabinofuranosyl hypoxanthine was substituted for guanosine and other reactants were used in amounts of about one-tenth of those in Example 2. As a result, 11 g. of 1-α-D-arabinofuranosyl hypoxanthine 5'-phosphate was obtained.

EXAMPLE 12

Example 2 was repeated according to the same procedures as described therein except that 1.2 g. of 1-β-D-glucopyranosyl hypoxanthine was substituted for guanosine and other reactants were used in amounts of about one-tenth of those in Example 2. As a result, 1.1 g. of 1-β-D-glucopyranosyl hypoxanthine 6'-phosphate (disodium salt) was obtained.

EXAMPLE 13

Example 2 was repeated according to the same procedures as described therein except that 35 ml. of tetrahydrofuran was used in place of acetonitrile. As a result, 12.5 g. of disodium 5'-guanylate was obtained.

EXAMPLE 14

Example 1 was repeated according to the same procedures as described therein except that 0.9 g. of exotic acid was used in place of formic acid. As a result, 12.8 g. of disodium 5'-inosinate containing a small amount of unknown compound was obtained.

EXAMPLE 15

Example 1 was repeated according to the same procedures as described therein except that 30% aqueous solution of propionic acid was used in place of formic acid and the reaction time was 2.5 hours. As a result, 13 g. of disodium 5'-inosinate was obtained.

EXAMPLE 16

Example 2 was repeated according to the same procedures as described therein except that formic acid was used in an amount of 2.5 ml., instead of 5.3 ml. As a result, 9.8 g. of disodium 5'-guanylate was obtained.

EXAMPLE 17

Example 2 was repeated according to the same procedures as described therein except that pyridine was used in an amount of 12 ml., instead of 19.5 ml. As a result, 11 g. of disodium 5'-guanylate was obtained.

EXAMPLE 18

Example 2 was repeated according to the same procedures as described therein except that 35 ml. of tributylamine was used in place of pyridine, inosine was used in place of guanosine and the reaction was carried out for 3 hours at —5° C. As a result, 6 g. of disodium 5'-inosinate was obtained.

EXAMPLE 19

Example 2 was repeated according to the same procedures as described therein except that 6 g. of phosphorus oxybromide was substituted for phorphorus oxychloride and other reactants were used in amounts of about one-tenth of those in Example 2. As a result, 1.3 g. of disodium 5'-guanylate was obtained.

EXAMPLE 20

Example 2 was repeated according to the same procedures as described therein except that 11.4 g. of xanthosine was used in place of guanosine and the reaction was carried out for 6 hours. As a result, 12.7 g. of disodium 5'-xanthylate was obtained.

EXAMPLE 21

Example 4 was repeated according to the same procedures as described therein except that 14.1 g. of cytidino was used instead of 9.4 g., and the amount of active carbon used for the treatment was 200 g., instead of 130 g. As a result, 16.3 g. of disodium 5'-cytidylate was obtained.

EXAMPLE 22

Example 2 was repeated according to the same procedures as described therein except that a mixture of 20 ml. of acetonitrile and 20 ml. of nitromethane was used as a solvent. As a result, 13.9 g. of disodium 5'-guanylate was obtained.

EXAMPLE 23

Example 2 was repeated according to the same procedures as described therein except that 19 ml. of an equal amount mixture of α-picoline and γ-picoline was used in place of pyridine. As a result, 13.6 g. of disodium 5'-guanylate was obtained.

EXAMPLE 24

Example 1 was repeated according to the same procedures as described therein except that 2,4-lutidine was used in place of pyridine. As a result, 4.2 g. of disodium 5'-guanylate was obtained.

EXAMPLE 25

Example 2 was repeated according to the same procedures as described therein except that triethylamine was used in place of pyridine. As a result, 4.2 g. of disodium 5'-guanylate was obtained.

We claim:
1. A process for producing a nucleotide wherein a phosphate group is added to a primary alcohol which comprises reacting a nucleoside with a mixture of (1) phosphorous oxyhalogenide, (2) a member selected from the group consisting of carboxylic acid and an aqueous carboxylic acid, and (3) an organic base in a polar organic solvent, the molar ratio of (1):(2):(3) being 2–8:1:4:2–8, and mixing the resultant reaction mixture with water.

2. A process according to claim 1 wherein in said carboxylic acid is formic acid.

3. A process according to claim 1 wherein said organic base is cyclic tertiary amine.

4. A process according to claim 3 wherein said cyclic tertiary amine is at least a member selected from the group consisting of pyridine, picoline, lutidine and collidine.

5. A process according to claim 1 wherein said nucleoside is ribonucleoside.

6. A process according to claim 1 wherein said polar organic solvent is at least a member selected from the group consisting of nitriles, nitro-compounds, cyclic ethers and halogenated hydrocarbons.

7. A process according to claim 1 wherein the reaction temperature is $-30°$ C. $- +30°$ C.

8. A process according to claim 1 wherein said phosphorus oxyhalogenide is a member selected from the group consisting of phosphorus oxytrichloride and phosphorus oxytribromide.

9. A process according to claim 1 wherein the necleoside is inosine.

10. A process according to claim 1 wherein the nucleoside is guanosine.

References Cited
UNITED STATES PATENTS
3,382,232   5/1968   Honjo et al. _____ 260—211.5

LEWIS GOTTS, Primary Examiner

JOHNNIE R. BROWN, Assistant Examiner